(12) United States Patent
Andersen et al.

(10) Patent No.: US 9,543,748 B2
(45) Date of Patent: Jan. 10, 2017

(54) FAULT PROTECTION SYSTEM FOR A POWER SYSTEM OF DYNAMICALLY POSITIONED VESSEL

(71) Applicant: Siemens Aktiengesellschaft, Munich (DE)

(72) Inventors: Rune B. Andersen, Oslo (NO); Svein Blystad, Sandefjord (NO); Inge Haukaas, Oslo (NO); Gunnar Koenig, Oslo (NO); Damir Radan, Sandnes (NO); Stig Olav Settemsdal, Trondheim (NO)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 921 days.

(21) Appl. No.: 13/863,986

(22) Filed: Apr. 16, 2013

(65) Prior Publication Data
US 2013/0270902 A1    Oct. 17, 2013

(30) Foreign Application Priority Data

Apr. 17, 2012 (EP) .................................. 12164474

(51) Int. Cl.
*H02H 3/08* (2006.01)
*B60R 16/03* (2006.01)
(Continued)

(52) U.S. Cl.
CPC ............... *H02H 3/08* (2013.01); *B60R 16/03* (2013.01); *H02H 7/26* (2013.01); *B63H 23/24* (2013.01); *B63H 25/42* (2013.01); *B63J 2003/002* (2013.01)

(58) Field of Classification Search
CPC ............. H02H 3/08; H02H 7/26; B60R 16/03; B63H 25/42; B63H 23/24
See application file for complete search history.

(56) References Cited

U.S. PATENT DOCUMENTS 4,306,265 A    12/1981    Kuntner et al. ................ 361/31
4,682,263 A    7/1987    Gradnitzer et al. ............ 361/31
(Continued)

FOREIGN PATENT DOCUMENTS

CN    100380766 C    4/2008    ............... H02H 3/08
CN    101237144 A    8/2008    ............... H02H 7/26
(Continued)

OTHER PUBLICATIONS

Chinese Office Action, Application No. 201310133027.3, 12 pages, Apr. 16, 2015.
(Continued)

*Primary Examiner* — Zeev V Kitov
(74) *Attorney, Agent, or Firm* — Slayden Grubert Beard PLLC (57) ABSTRACT

A fault protection system for a power system of a dynamically positioned vessel is provided. The power system is separated into two or more power system sections, each including a bus section of a power distribution bus. The bus sections are connected by bus ties in a ring configuration. Each bus section includes a connection to a generator and a connection to a thruster drive of the dynamically positioned vessel. The fault protection system includes a fault isolation system which includes for each power system section a bus tie circuit breaker for breaking the connection provided by the bus tie.

15 Claims, 4 Drawing Sheets

(51) Int. Cl.
*H02H 7/26* (2006.01)
*B63H 25/42* (2006.01)
*B63H 23/24* (2006.01)
*B63J 3/00* (2006.01)

(56) References Cited

U.S. PATENT DOCUMENTS

| | | | | |
|---|---|---|---|---|
| 4,952,852 | A | 8/1990 | Bando et al. | 318/140 |
| 5,305,234 | A * | 4/1994 | Markus | H02H 6/005 |
| | | | | 361/20 |
| 5,666,044 | A * | 9/1997 | Tuozzolo | G05F 1/573 |
| | | | | 323/273 |
| 6,297,939 | B1 | 10/2001 | Bilac et al. | 361/64 |
| 6,914,762 | B2 | 7/2005 | Bo | 361/62 |
| 6,937,453 | B2 | 8/2005 | Kase et al. | 361/81 |
| 7,542,256 | B2 | 6/2009 | Premerlani et al. | 361/62 |
| 7,599,161 | B2 | 10/2009 | Premerlani et al. | 361/62 |
| 7,806,065 | B1 * | 10/2010 | Bekker | B63H 5/125 |
| | | | | 114/144 B |
| 8,385,035 | B2 | 2/2013 | Narel et al. | 361/62 |
| 8,400,740 | B2 | 3/2013 | Schumacher et al. | 361/54 |
| 8,680,707 | B2 | 3/2014 | Childs et al. | 307/9.1 |
| 8,788,108 | B2 * | 7/2014 | Kulathu | H02J 3/14 |
| | | | | 700/286 |
| 8,964,367 | B2 | 2/2015 | Nonaka | 361/679.24 |
| 2005/0184589 | A1 * | 8/2005 | Fujita | B63J 3/04 |
| | | | | 307/19 |
| 2008/0158750 | A1 | 7/2008 | Premerlani et al. | 361/63 |
| 2008/0158753 | A1 | 7/2008 | Premerlani et al. | 361/80 |
| 2008/0182466 | A1 * | 7/2008 | Wegner-Donnelly | B63H 23/24 |
| | | | | 440/84 |
| 2013/0215543 | A1 | 8/2013 | Hoeven | 361/63 |
| 2013/0271879 | A1 | 10/2013 | Andersen et al. | 361/20 |

FOREIGN PATENT DOCUMENTS

| | | | |
|---|---|---|---|
| DE | 202007018606 U1 | 2/2009 | H02H 7/22 |
| EP | 2243700 A2 | 10/2010 | B63H 21/17 |
| EP | 2262074 A1 | 12/2010 | H02H 11/00 |
| EP | 2442417 A1 | 4/2012 | B63B 39/08 |
| JP | 57088826 A | 6/1982 | H02H 7/26 |
| JP | 8021264 A | 1/1996 | F02C 9/28 |
| JP | 9233896 A | 9/1997 | H02P 9/04 |
| JP | 2001028848 A | 1/2001 | H02J 11/00 |
| JP | 2001346326 A | 12/2001 | H02H 3/28 |
| JP | 2007006673 A | 1/2007 | H02H 3/38 |
| JP | 2007318951 A | 12/2007 | H02H 3/00 |
| JP | 2008167647 A | 7/2008 | H02H 3/38 |
| JP | 2011135764 A | 7/2011 | B63H 21/17 |
| JP | 2011193586 A | 9/2011 | H02J 3/46 |
| JP | 2013223424 A | 10/2013 | H02H 3/28 |
| JP | 2013540416 A | 10/2013 | H02H 3/26 |
| WO | 98/48497 A1 | 10/1998 | H02H 7/26 |

OTHER PUBLICATIONS

Japanese Office Action, Application No. 2013-086640, 5 pages Mar. 31, 2014.
Singapore Search Report and Written Opinion, Application No. 201302708, 10 pages, Mar. 11, 2014.
Gulf Cooperation Council Examination Report, Application No. GC 2013-24037, 4 pages, Sep. 5, 2016.

* cited by examiner

FAULT PROTECTION SYSTEM FOR A POWER SYSTEM OF DYNAMICALLY POSITIONED VESSEL

CROSS-REFERENCE TO RELATED APPLICATIONS

This application claims priority to EP Patent Application No. 12164474.4 filed Apr. 17, 2012. The contents of which is incorporated herein by reference in its entirety.

TECHNICAL FIELD

The disclosure relates to a fault protection system of a power system of a dynamically positioned vessel, to a power system of a dynamically positioned vessel and to a corresponding method.

BACKGROUND

Floating vessels, such as semi submersibles, drill ships, floating production storage and offloading (FPSO) vessels or the like can be provided with dynamic positioning systems. Such dynamically positioned vessels can use electrically driven propellers, i.e. electric thrusters, to keep position during oil and gas drilling operations, station keeping, anchoring, port maneuvering and the like. For certain types of operations, in which an increased risk of oil pollution, loss of life, collisions or the like exists, it has to be ensured that the position of the vessel is kept for minimizing these risks. Integrity and failure safe operation of the power system which supplies electric power to the thrusters of the dynamically positioned vessel are thus of particular importance.

The vessels can be classified into different classes, such as DP2 (dynamic positioning 2), DP3 or the like. High risk operations such as drilling operations or the approach of other vessels may for example require a certain mode of operation for a particular vessel class. To ensure that a malfunction of a component does not lead to a complete blackout of the power system of the dynamically positioned vessel, the power system needs to be split into several sections, e.g. 2 to 4, in such high risk mode of operation. Each section of the power system is located in a separate engine room, the engine rooms being isolated with fire proof and water tight walls. During such high risk operations, the sections of the power system are electrically isolated, e.g. by opening connections provided by electric cables termed bus ties. One or more engines with connected generators have to be run per power system section in order to supply electric power to connected loads, e.g. to the electric motors of the thrusters. Consequently, in a system with only three sections, three, four or more engines will be running most of the time, the number increasing with the number of sections.

The engines will generally run at relatively low power output, wherein the specific fuel consumption of these engines in the low operating range is generally higher. Consequently, fuel consumption of such power system is high compared to an operational mode in which the sections of the power system can be electrically connected, so that for example only two generators need to be operated, each at a higher load.

Besides the increased fuel consumption and CO2 emission, running several engines in parallel with reduced load can further result in soot accumulating in the combustion chambers, increased operating hours for the generator sets and thus higher costs of maintenance. Since the engines will run most of the time, the blackout risk is also increased.

Operating such system with interconnected power system sections, i.e. with connected bus ties, is generally not possible since a fault, such as a short circuit or generator failure, will generally result in a total blackout of the vessel's power system. Such blackout will result in a loss of position of the vessel, which can be detrimental; it can result in an oil spill or the loss of life. It is thus desirable to improve such power systems of dynamically positioned vessels, and to achieve operation with reduced fuel consumption and higher efficiently of the engines powering the generators. It is also desirable to maintain such fuel efficient operation during high risk operations, without compromising the integrity and the safe operation of the power system.

SUMMARY

One embodiment provides a fault protection system of a power system of a dynamically positioned vessel, wherein the power system is separated into two or more power system sections each comprising a bus section of a power distribution bus, wherein the bus sections are connected by bus ties in a ring configuration, and wherein each power system section comprises two or more power system subsections each comprising a bus subsection of the power distribution bus, the bus subsections of the same power system section being connected by one or more bus couplers, wherein each bus section comprises a connection to a generator and a connection to a thruster drive of the dynamically positioned vessel, wherein the fault protection system comprises: a fault isolation system including for each power system section a bus tie circuit breaker for breaking the connection provided by the bus tie and one or more bus coupler circuit breakers for breaking the connection provided by the one or more bus couplers, the fault isolation system being configured to implement a differential over-current protection scheme for operating at least the bus tie circuit breaker and the bus coupler circuit breaker; a generator ride through system comprising for each power system section an excitation limiter for the generator coupled to the respective bus section, the generator ride through system being adapted to limit the excitation field current provided to the generator upon occurrence of a fault; and a thruster drive ride through system configured to provide electric energy to a DC bus of a variable frequency drive of the thruster drive of each power system section upon occurrence of a fault so as to maintain the voltage on the DC bus above a predetermined voltage threshold; wherein the fault protection system is configured, upon the occurrence of a fault in the power system, to isolate the fault by tripping the component of the power system in which the fault occurred and/or by opening one or more circuit breakers in the power system subsection in which the fault is located, and to continue operation of the power system with the remaining bus tie circuit breakers and bus coupler circuit breakers closed.

In a further embodiment, the fault isolation system is configured to implement a differential over-current protection and/or a directional over-current protection against faults for at least the bus ties and the bus subsections.

In a further embodiment, the fault isolation system comprises protection relays for operating at least the bus tie circuit breakers and the bus coupler circuit breakers, the protection relays implementing the differential over-current protection and/or the directional over-current protection for the bus ties and the bus subsections.

In a further embodiment, the fault isolation system is further configured to implement a short circuit and overcurrent protection as a back-up by means of at least the bus tie circuit breakers and the bus coupler circuit breakers.

In a further embodiment, the fault isolation system further comprises for each power system section, e.g., for each power system subsection, a generator circuit breaker for breaking the connection to the generator and a thruster drive circuit breaker for breaking the connection to the thruster drive.

In a further embodiment, the fault protection system further comprises an automatic voltage regulator containing the excitation limiter, the automatic voltage regulator being adapted to automatically adjust the voltage provided by the respective generator to keep the voltage within an operation band.

In a further embodiment, the automatic voltage regulator is adapted to detect the occurrence of a fault by detecting a drop in the voltage at the generator output or at the power distribution bus, the automatic voltage regulator being adapted to decrease a voltage setpoint for the generator after the detection of a fault and to control the output voltage of the generator in accordance with the reduced voltage setpoint, so as to limit voltage overshoot after the occurrence of a fault.

In a further embodiment, the thruster drive ride through system comprises a variable frequency drive controller for the variable frequency drive of each thruster drive, the variable frequency drive controller being adapted to decrease the output frequency of the respective variable frequency drive upon a drop in voltage on the DC bus of the variable frequency drive, thereby causing the variable frequency drive to operate in a generating condition in which electric energy is generated by an electric motor of the thruster drive and is fed back to the DC bus to maintain the voltage on the DC bus above the voltage threshold.

In a further embodiment, the thruster drive ride through system comprises a power storage device, such as a battery, which is coupled to the DC bus of the variable frequency drive, the power storage device being adapted to supply electric power to the DC bus in case of a drop of voltage on the DC bus in order to maintain the voltage on the DC bus above the voltage threshold.

10. The fault protection system according to any of the preceding claims, wherein the power system further comprises for each power system subsection a connection to a thruster utilities switchboard electrically coupled to the generator of the respective power system subsection for providing electric power to utilities of the thruster drive, and a connection to an engine support switchboard electrically coupled to the generator of the respective power system subsection for providing electric power to utilities of the engine operating the generator of the power system subsection, the fault protection system further comprising for each power system subsection a circuit breaker for breaking the connection to the thruster utilities switchboard and the engine support switchboard.

In a further embodiment, the fault protection system further comprises an uninterruptable power supply for each power system subsection, the uninterruptable power supply being coupled to the thruster utilities switchboard and/or the engine support switchboard.

In a further embodiment, the fault protection system further comprises an electric interlink connection from the thruster utilities switchboard or the engine support switchboard of one power system subsection to the uninterruptible power supply of another power system subsection.

Another embodiment provides a power system of a dynamically positioned vessel, comprising a fault detection system as disclosed above.

In a further embodiment, the power system further comprises for each power system subsection a connection to a thruster utilities switchboard for providing electric power to utilities of the thruster drive, and a connection to an engine support switchboard for providing electric power to utilities of the engine operating the generator of the power system subsection, the power system further comprising a transformer for each power system subsection connected to the respective bus subsection, the transformer providing electric power to a respective thruster drive coupled to the bus subsection, wherein the transformer comprises an additional secondary winding electrically coupled to the thruster utilities switchboard and the engine support switchboard of the power system subsection for providing electric power to both switchboards.

Another embodiment provides a method of operating a fault protection system, comprising the steps of: detecting a fault in the power system; localizing the fault in the power system; electrically isolating the component in which the fault occurred from the remaining power system by opening a circuit breaker coupled to the component or isolating the power system subsection in which the fault occurred from the remaining power system by opening bus tie and/or bus coupler circuit breakers of the respective bus subsection; and continuing operation of the power system with the remaining bus tie circuit breakers and bus coupler circuit breakers closed.

BRIEF DESCRIPTION OF THE DRAWINGS

Exemplary embodiments will be explained in more detail below on the basis of the schematic drawings, wherein.

DETAILED DESCRIPTION

Embodiments of the present disclosure may improve the operation of power systems of dynamically positioned vessels, e.g., for reducing fuel consumption of the vessel while maintaining operational safety of such power systems.

Some embodiments provide a fault protection system of a power system of a dynamically position vessel is provided. The power system is separated into two or more power system sections each comprising a bus section of a power distribution bus. The bus sections are connected by bus ties in a ring configuration. Each power system section comprises two or more power system subsections. Each power system subsection comprises a bus subsection of the power distribution bus, wherein the bus subsections of the same power system section are connected by one or more bus couplers, thus forming the respective bus section. Each bus section comprises a connection to a generator and a connection to a thruster drive of the dynamically positioned vessel. The fault protection system comprises a fault isolation system including for each power system section a bus tie circuit breaker for breaking the connection provided by the bus tie and one or more bus coupler circuit breakers for breaking the connection provided by the one or more bus couplers. The fault isolation system is configured to implement a differential over-current protection scheme for operating at least the bus tie circuit breaker and the bus coupler circuit breaker. The fault protection system further comprises a generator ride through system comprising for each bus section an excitation limiter for the generator coupled to the respective bus section. The generator ride through system is adapted to limit the excitation field current provided to the generator upon occurrence of a fault. The fault protection system further comprises a thruster drive ride through system configured to provide electric energy to a DC bus of a variable frequency drive (VFD) of the thruster drive of each bus section upon occurrence of a fault so as to maintain the voltage on the DC bus above a predetermined voltage threshold. The fault protection system is configured so that upon occurrence of a fault in the power system, the fault is isolated by tripping the component of the power system in which the fault occurred and/or by opening one or more circuit breakers in the power system subsection in which the fault is located. Furthermore, it is configured to continue operation of the power system with the remaining bus tie circuit breakers and bus coupler circuit breakers closed.

Such fault protection system allows an isolation of the fault in the respective component or by electrically isolating the whole power system subsection, in particular by opening the circuit breakers at both ends of the respective bus subsection, e.g. a bus tie circuit breaker and a bus coupler circuit breaker. Since a differential protection scheme is used, the subsection in which the fault is located can be determined efficiently, and isolation of the fault can occur without affecting the remaining power system subsections, in particular without separating the remaining bus sections. By means of the ring configuration, the remaining bus sections remain connected. The whole power system can thus operate with only two generators. Even if the power system subsection of which one of the generators is part needs to be isolated, the whole power system remains operational since the remaining generator can supply all loads of the remaining power system subsections with electric power, since they stay connected.

In particular, the fault protection system may be configured so that a fast recovery from a voltage dip originated by a fault is achieved, so that upon occurrence of a fault, the power system can continue to operate with closed breakers.

Furthermore, the generator ride through system and the thruster drive ride through system ensure that the remaining running generator(s) and the connected thruster drives stay operational. A fault in the power system, e.g. a short circuit, a ground fault or the like, will generally lead to a voltage drop on the power distribution bus. The generator ride through system ensures that the generator (S) which remains connected to the still operational power distribution bus sections continues to operate. In particular, it prevents that the exciter of the generator gets damaged and that violent torque changes occur at the generator. The automatic voltage regulation of such generators may otherwise lead to excessive currents in the exciter when it tries to bring the voltage on the power distribution bus back to normal. By means of the thruster drive ride through system, the thruster drive can stay operational throughout the fault. When the voltage drops on the power distribution bus during a fault, the voltage at the DC bus of the variable frequency drive will similarly drop, which results in the need to restart the VFD. This is a time consuming process during which the corresponding thruster drive is inoperable. Position loss of the vessel may result. By supplying electric energy to the DC bus of the VFD, the VFD can be kept alive and the thruster can immediately continue to operate as soon as the fault is cleared and power is restored on the power distribution bus.

The fault protection system thus achieves a safe operation of the power system, wherein a fault in a component of the power system will neither lead to a blackout of the whole power system, nor to the loss of position. In such setup, the fault protection system may be configured to restore electric power on the power distribution bus in less than one second, e.g., in less than 500 ms or even less than 250 ms. The fault protection system may enable the dynamically positioned vessel to operate with closed bus tie circuit breakers even in high risk situations, such as drilling, approaching of other vessels or the like, in particular in DP2 or DP3 operational modes. Since operation with electrically connected bus ties is possible, fuel consumption can be reduced significantly, and the lifetime of engines and generators can be prolonged. $CO_2$ emission can be decreased and cost savings can be achieved.

In an embodiment, the fault isolation system is configured to implement a differential over-current protection and/or a directional over-current protection against faults for at least the bus ties and the bus subsections. In differential over current protection, it may for example be checked at both ends of the bus ties which current is flowing into the bus tie and out of the bus tie. Similarly, for the bus subsection, the magnitude of the current flowing into and out of the bus subsection may be checked. Furthermore, a logic may be used for checking the direction of the currents.

In an embodiment, the differential over-current protection may be used as a primary protection scheme, whereas the directional over-current protection may be used as a backup, in particular for the bus ties and the bus subsections. It can thus be ensured that the location of the fault in a particular power system subsection can be identified and can consecutively be isolated.

The fault detection system may for example comprise protection relays for operating at least the bus coupler circuit breakers and the bus tie circuit breakers. The protection relays may implement the differential over current protection and/or the directional over current protection for the bus ties and the bus subsections. As an example, relays located at both ends of the bus ties may measure the current and may communicate with each other in order to provide differential over-current protection, and the relays may trigger upon predetermined conditions. Protection relays may furthermore be provided for operating the generator and thruster drive circuit breakers.

In an embodiment, the fault isolation system may furthermore be configured to implement a short circuit and over-current protection as a backup by means of at least the bus tie circuit breakers and the bus coupler circuit breakers. Again, protection relays may be configured to provide the short circuit and over-current protection. In case the conditions for triggering the differential protection or directional protection are not met or the differential or directional protection is not working properly, the fault can still be isolated by means of the backup function of short circuit and over current protection.

Each bus subsection may comprise a connection to a generator and a connection to a thruster drive of the dynamically positioned vessel. The generator ride through system and the thruster drive ride through system may be provided for the generator and the thruster drive, respectively, of each bus subsection. Accordingly, if in a particular power system section, one power system subsection needs to be isolated due to the occurrence of a fault, the one or more remaining power system subsections of the same power system section can continue to operate by supplying electric energy from the generator to the one or more thruster drives. Loss of function can thus be efficiently restricted to the power system subsection in which the fault occurred.

The fault isolation system may further comprise for each power system section, e.g., for each power system subsection, a generator circuit breaker for breaking the connection to the generator and a thruster drive circuit breaker for breaking the connection to the thruster drive. As mentioned above, these circuit breakers may again be operated by protection relays. In an embodiment, the fault protection system implements differential over current protection for the generator and furthermore implements short circuit and over current protection for the thruster drive. As a backup for the generator circuit breaker differential protection, a short circuit and over-current protection may be provided. As a backup for the protection provided by the thruster drive circuit breaker, a breaker failure protection may be provided, according to which all circuit breakers in the subsection are opened upon detection of a breaker failure. Thus, in case a fault occurs in the thruster drive and the thruster drive circuit breaker fails, the fault can still be isolated efficiently by isolating the whole power system subsection.

The short circuit and over current protection may be configured to trip the associated circuit breaker if the current through the circuit breaker exceeds a threshold value. This can occur with a predefined delay, to allow other circuit breakers in the system to trip first. Also, the corresponding protection relay may implement a directional functionality, in accordance with which the threshold values for the overcurrent or the tripping delay depend on the direction of the current through the circuit breaker. The protection relay and associated circuit breaker can thus be integrated in the directional protection scheme for e.g. the bus subsection.

The fault protection system may be configured to trip a generator, e.g. to open the generator circuit breaker, upon occurrence of a fault in the automatic voltage regulator (AVR) of this generator or in the governor associated with this generator. It may thus be prevented that if the generator for example produces excess or consumes excess reactive power due to a fault in the AVR, it forces other generator into an under excited or over excited state, thus effectively propagating the fault through the power system. In an embodiment, the fault protection system further comprises an automatic voltage regulator (AVR) containing the excitation limiter. The automatic voltage regulator is adapted to automatically adjust the voltage provided by the respective generator to keep the voltage within an operation band. The AVR may furthermore comprise an under excitation limiter adapted to limit the inflow of reactive power into the respective generator. It may thus prevent the generator from going into an under excited state. The AVR will generally try to regulate voltage on the power distribution bus or reactive power in the system. A failure in another generator may cause that excess reactive power is created in the power system, the AVR trying to make the generator draw this excess reactive power to prevent a high voltage condition in the power system. This may lead to an under excited operating condition of the generator, which can be prevented by means of the under excitation limiter.

The afore mentioned excitation limiter, also termed over excitation limiter, may be configured to detect a over current condition of the excitation field current, and may limit the excitation field current or ramp down the excitation field current to a preset value. Accordingly, prolonged excitation field over current can be prevented and the generator can be protected from overheating.

Furthermore, the AVR may be configured to limit a voltage overshoot after the occurrence of a fault. In a conventional system, the AVR may try to maintain a predetermined voltage level on the power distribution bus, so that upon occurrence of a fault and a voltage drop on the power distribution bus, the AVR will try to obtain a maximum voltage output of the generator. Upon isolation of the fault, a large voltage overshot may thus occur on the power distribution bus, which can result in the tripping of components connected thereto. This can be prevented if the AVR is configured to limit the voltage overshoot after the occurrence of a fault.

In an embodiment, the AVR is adapted to detect the occurrence of a fault by detecting a drop in the voltage at the generator output or at the power distribution bus. The AVR is adapted to decrease a voltage setpoint for the generator after the detection of a fault and to control the output voltage of the generator in accordance with the reduced voltage set point so as to limit voltage overshoot after the occurrence of a fault. The tripping of consumers due to over voltage on the power distribution bus can thus be prevented efficiently. The voltage overshoot after the clearance of the fault can be kept low. The AVR may furthermore be configured to ramp up the voltage set point back to the operating voltage setpoint within a predetermined amount of time after the fault is cleared. The system 10 thus smoothly returns to normal operating conditions after occurrence of a fault.

The thruster drive ride through system of the fault protection system may be configured to maintain the voltage on the DC bus above the voltage threshold by means of kinetic energy recovery using kinetic energy of the thruster drive.

In an embodiment, the thruster drive ride through system may comprise the variable frequency drive of each thruster drive, and the variable frequency drive may be adapted to decrease the output frequency upon a drop in voltage on the DC bus of the variable frequency drive. Such drop of voltage may for example occur after the occurrence of a fault in the power system. By decreasing the output frequency of the variable frequency drive (VFD), the VFD may be caused to operate in a generating condition in which electric energy is generated by an electric motor of the thruster drive. The generated electric energy is fed back to the DC bus to maintain the voltage on the DC bus above the voltage threshold. The kinetic energy of the rotor of the thruster drive may for example continue to turn the electric motor, the electric motor thus generating electric energy and maintaining the voltage on the DC bus. The thruster drive ride through system can be configured so that the generation of electric energy continues at as long as possible, stored kinetic energy may be recovered down to a zero rotation of the propeller of the thruster drive. Since the power system generally achieves relatively fast fault isolation, the power will generally be restored before this point is reached. By these measures, the VFD may be "kept alive", in particular the capacitors coupled to the DC bus may remain charged, so that operation of the thruster drive can continue immediately after restoring the power. Loss of position of the vessel can thus be kept small or even prevented.

The inverter part of the VFD coupled to the DC bus, which provides electric power at variable frequency to the electric motor of the thruster drive during normal operation, may operate as a rectifier for the voltage generated by the electric motor of the thruster drive during kinetic energy recovery. The DC voltage on the DC bus can thus be maintained. This type of ride through may also be termed inertia ride through or kinetic buffering.

In an embodiment, the thruster drive ride through system may comprise a power storage device, such as a battery, which is coupled to the DC bus of the variable frequency drive. The power storage device may be adapted to supply electric power to the DC bus in case of a drop of voltage on the DC bus in order to maintain the voltage on the DC bus above the voltage threshold. Such power storage device may be provided additionally or alternatively to the kinetic energy recovery. The time over which the DC bus can be kept alive may thus be prolonged.

The thruster drive ride through system may be implemented in a controller of the variable frequency drive (VFD).

In a further embodiment, the power system may comprise for each power system subsection a connection to a thruster utilities switchboard which is electrically coupled to the generator of the respective power system subsection for providing electric power to utilities of the thruster drives. It can further provide a connection to an engine support switchboard electrically coupled to the generator of the respective power system subsection for providing electric power to utilities of the engine operating the generator of the power system subsection. The fault protection system may further comprise for each power system subsection a circuit breaker for breaking the connection to the thruster utility switchboard and the engine support switchboard. In such configuration, the thruster utilities and the engine support switchboards can draw their electric power from the generator of the same power system subsection. Accordingly, each power system subsection is operable as an isolated island. Thus, if a power system subsection becomes completely isolated, it can continue to operate its connected thruster drive by supplying electric power from the generator to the thruster drive. Further, if the whole power system section becomes isolated due to the occurrence of a fault in one of its subsections, a thruster drive within this isolated power system section may still be operable, since the other power system subsection(s) can be isolated and can operate independently.

Also, if a fault occurs in a power system subsection, the thruster utilities and engine support switch boards can be electrically isolated from the remaining parts of the power system of the subsection, and operation of the thruster utilities or engine utilities may continue from a different power source. Thus, the thruster drive and/or the generator can stay operational after the occurrence of a fault, and may quickly be switched back online after clearance of the fault.

The fault protection system may furthermore comprise an uninterruptable power supply (UPS) for each power system subsection. The uninterruptable power supply may be coupled to the thruster utility switch board and/or the engine support switch board. The UPS can supply electric power to these switchboards after the switchboards were separated from the remaining power system of the respective power system subsection.

Furthermore, an electrical interlink connection may be provided from the thruster utility switchboard or the engine support switchboard of one power system subsection to the uninterruptable power supply of another power system subsection. Accordingly, redundancy of the UPS can be achieved for each of theses switchboards. Each of these switchboards may be connected to two uninterruptable power supplies. It can thus be ensured that the engine auxiliaries and the thruster auxiliaries can continue to operate in most situations, so that the respective generator and thruster drive can quickly be brought back online. The electrical interlink connection can be configured such that the thruster utility switchboard and the engine support switchboard of the one power system subsection remain galvanically isolated from the thruster utility switchboard and the engine support switchboard of the other power system subsection.

Other embodiments provide a power system of a dynamically positioned vessel. The power system comprises a fault detection system in any of the above outlined configurations. In particular, all features mentioned above may be part of this power system, in combination or in isolation. With such power system, advantages similar to the ones outlined further above can be achieved.

In an embodiment, the power system further comprises for each power system subsection a connection to a thruster utility switchboard for providing electric power to utilities of the thruster drive and a connection to an engine support switchboard for providing electric power to utilities of the engine operating the generator of the power system subsection. The power system further comprises a transformer for each power system subsection connected to the respective bus subsection. The transformer provides electric power to a respective thruster drive coupled to the bus subsection. The transformer comprises an additional secondary winding which is electrically coupled to the thruster utilities switchboard and the engine support switchboard of the power system subsection for providing electric power to these switchboards.

Cost, size and weight of the power system can thus be reduced, since these switchboards are fed from the same transformer as the respective thruster drive. In an embodiment, the transformer may comprise four windings, one primary winding coupled to the power distribution bus, two secondary windings coupled to the thruster drive, and the additional secondary winding coupled to the switchboards. Note that each of these windings may effectively comprise three windings for three-phase electric power, and that the windings may be connected in different configurations, e.g. star or delta configuration (for the three phases). The first secondary winding for the thruster drive may for example be connected in a star configuration whereas the second secondary winding for the thruster drive may be connected in a delta configuration, so as to achieve an input of two times three phases of AC electric power into the VFD of the thruster drive for minimizing harmonic distortions in the VFD.

In an embodiment, the power system may be configured to provide a voltage in a low voltage range, e.g. 400 to 1.000 V, on the engine support switchboard and the thruster utilities switchboard. It may furthermore be configured to provide a voltage in a medium voltage range, e.g. a range of about 1.000 V to about 30.000 V AC on the power distribution bus. It may furthermore be configured to provide a voltage in the voltage range of about 1.000 V to about 10.000 V to the thruster drive, for example in a range between about 3.000 to about 8.000 V. The generators may thus be configured to provide an output in the medium voltage range of 1.000 to 30.000 V, e.g. between about 5.000 to about 15.000 V, for example 11.000 V.

The power system may be configured to be operable in a DP2 and/or DP3 mode of operation. In particular, it may be configured to operate in the DP3 mode of operation with the bus tie breakers and the bus coupler circuit breakers closed.

The dynamically positioned vessel may for example be a floating offshore platform, a semi-submersible, a drill ship, a floating production, storage and offloading (FPSO) vessel or the like.

Other embodiments provide a method of operating a fault protection system. The fault protection system is configured according to any of the above described configurations. The method comprises the steps of detecting a fault in the power system, localizing the fault in the power system e.g. by means of differential or directional over-current protection, or by detecting the fault in a particular component, and electrically isolating the component in which the fault occurred from the remaining power system by opening a circuit breaker coupled to the component or by isolating the power system subsection in which the fault occurred from the remaining power system by opening bus tie and/or bus coupler circuit breakers of the respective bus subsection. If a bus subsection is for example bordered by two bus subsections of the same power system section, two bus coupler circuit breakers may be opened, whereas if the bus subsection is bordered by a bus tie and another bus subsection, a bus tie circuit breaker and a bus coupler circuit breaker will be opened to isolate the respective power system subsection. In a further step of the method, operation of the power system is continued with the remaining bus tie circuit breakers and bus coupler circuit breakers closed.

With such method, a safe operation of the vessel can be achieved, which allows the vessel to operate the power system with closed bus tie circuit breakers even during risky operations, e.g. DP2 or DP3 operations. Fuel consumption and $CO_2$ emissions can thus be reduced. Furthermore, a fast isolation of the fault is possible while the remaining power system stays fully operational after the occurrence of a fault.

In an embodiment of the method, if the tripping of at least a bus tie circuit breaker or a bus coupler circuit breaker fails, the method may further comprise the tripping of a backup protection. The backup protection may comprise at least one of a directional over-current protection, a short circuit and over-current protection, or a breaker failure protection. The directional over-current protection may include a directional ground fault protection.

In a further embodiment, the method may comprise operating at least two generators, each at reduced load, the load being reduced so that if one generator stops supplying electric energy, the remaining generators are capable of bearing the full load. If a power system subsection is now isolated which is coupled to an operating generator, the electric power from the one or more remaining generators is distributed over the power distribution bus to the loads, thereby enabling the continuation of the operation of the loads. In such configuration, the power system can operate with a minimum number of generators running. The power distribution to the different loads becomes possible since after the occurrence of a fault, the bus tie circuit breakers and the bus coupler circuit breakers remain closed. Even in a system with three or four power system sections, only two generators may need to be run, which increases efficiency and decreases fuel consumption.

The method may further comprise the step, after occurrence of a fault, of starting a generator, the starting of a generator comprising the ramping up of a voltage setpoint by means of an automatic voltage regulator of the generator while the generator circuit breaker and the thruster drive circuit breakers remain closed. Using such procedure for the starting of a generator achieves a smooth energization of the transformer of the thruster drive without high inrush currents. Full system operability can thus be restored fast and efficiently after the occurrence of a fault.

Embodiments of the method may be carried out on the fault protection system or the power system in any of the configurations outlined above. Furthermore, any method steps described further above with respect to the fault protection system or the power system of the dynamically positioned vessel may be part of embodiments of the method.

The features of the embodiments disclosed herein can be combined with each other unless noted to the contrary.

In the following, example embodiments are described in detail with reference to the accompanying drawings. It is to be understood that the following description of the embodiments is given only for the purpose of illustration and is not to be taken in a limiting sense.

It should be noted that the drawings are to be regarded as being schematic representations only, and elements in the drawings are not necessarily to scale with each other. Rather, the representation of the various elements is chosen such that their function and general purpose become apparent to a person skilled in the art. It is also to be understood that the coupling of physical or functional units as shown in the drawings and described hereinafter does not necessarily need to be a direct connection of coupling, but may also be an indirect connectional or coupling, i.e. a connection or a coupling with one or more additional intervening elements, such as fuses, circuit breakers, transformers or the like. A skilled person will further appreciate that the physical or functional units illustrated and described herein with respect to the different embodiments do not necessarily need to be implemented as physically separate units. One or more physical or functional blocks or units may be implemented in a common circuit, chip, circuit element or unit, while other physical or functional blocks or units shown may be implemented in separate circuits, chips, circuit element or units.

Figure 1:
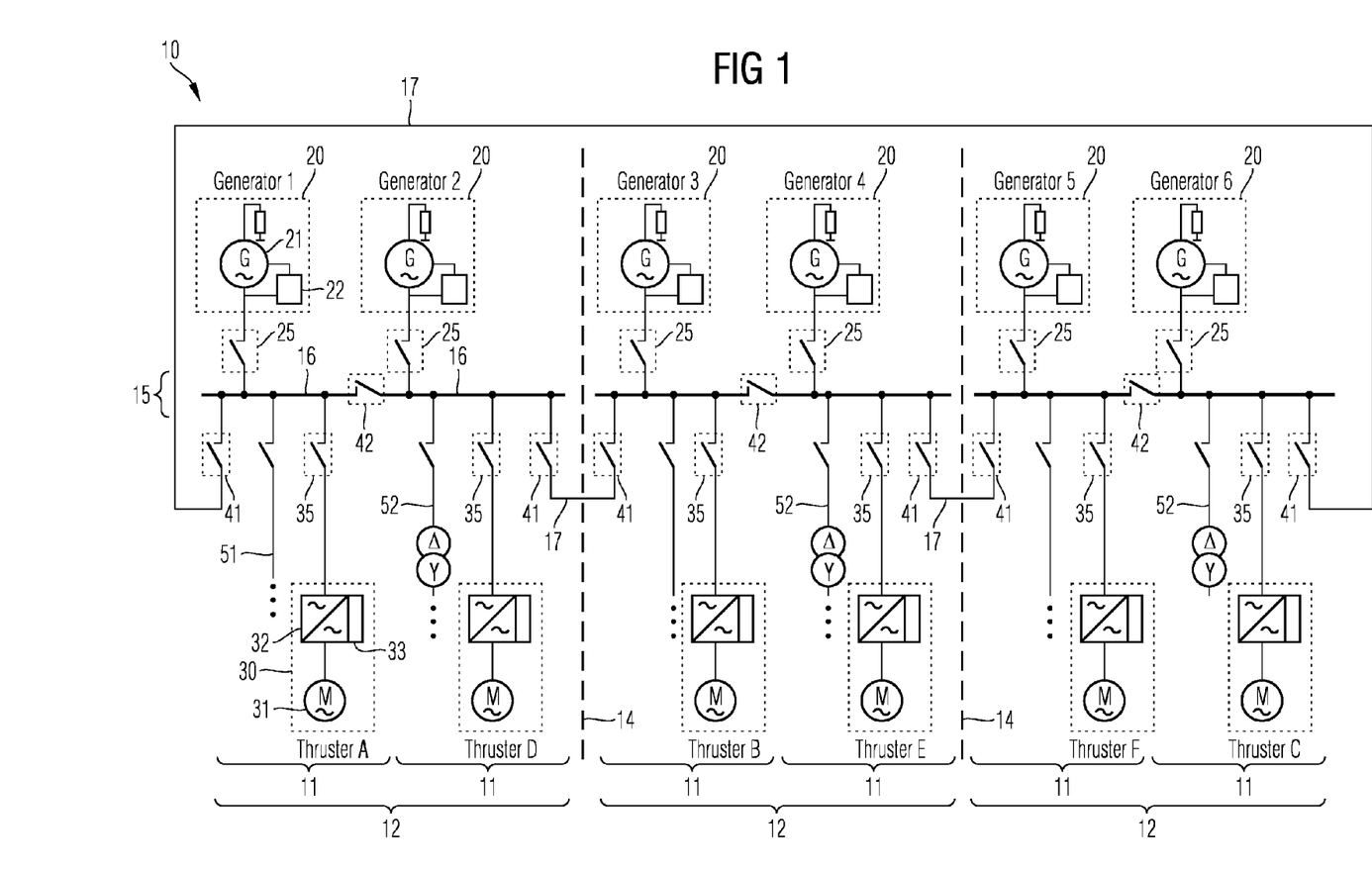
FIG. 1 is a schematic drawing of a power system of a dynamically positioned vessel including a fault protection system according to an example embodiment.

FIG. 1 shows a power system 10 of a dynamically positioned vessel in accordance with an example embodiment. In the example of FIG. 1, the power system 10 is split into three power system sections 12, wherein the engines of the different power system sections are arranged in different engine rooms of the dynamically positioned vessel. The engine rooms are separate fire proof and water tight walls 14.

The power system 10 comprises power sources 20 each comprising a generator 21, and loads coupled to the same power distribution bus 15. The loads comprise the thruster drives 30, each of which includes a variable frequency drive 32 for converting the frequency of the supplied AC voltage to a frequency with which the drive is to be operated, and an electric motor 31 which rotates the propeller of the thruster. Further loads 10 which may for example include drilling drives are connected by the electric connection 51 to the power distribution bus 15. Further, a low voltage power distribution system supplying smaller loads is connected via the electric connection 52 to the power distribution bus 15.

Each power system section 12 comprises a section of the power distribution bus 15. The bus sections are connected via bus ties 17. In the example of FIG. 1, the power distribution bus 15 comprises three sections which are separated by the fire and water tight walls 14. In other configurations, further sections, e.g. four or even more sections maybe provided, in accordance with the sectioning of the power system. The bus sections are connected in a ring configuration via the bus ties 17. This is in FIG. 1 illustrated by the upper bus tie 17 which connects the left hand end of the power distribution bus 15 to the right hand end of the power distribution bus 15. Bus tie circuit breakers 41 are provided at each end of the bus tie cable. They can also shortly be termed bus tie breakers. It is thus possible to electrically separate the bus sections of the power distribution bus 15. If a fault occurs in one section of the power system 10, the fault can accordingly not propagate to other sections of the power system 10. In conventional systems, the bus tie breakers 41 remain open during high risks operations.

It thus becomes immediately clear that in each section 12 of the power system 10, at least one generator 21 needs to be running. Each generator will thus run at relatively low load, leading to an inefficient operation of the power sources 20 and thus to an increased fuel consumption.

In the embodiment of FIG. 1, the bus sections are furthermore separable into bus subsections 16 by means of bus coupler circuit breakers 42. In the example of FIG. 1 the power system 10 can thus be separated into 6 power system subsections 11. If a fault occurs in a particular power system subsection 11, it becomes possible to electrically isolate this power system subsection from the remaining power system 10. Accordingly, only one thruster drive 30 is lost in such case, whereas in conventional systems, at least two thruster drives 30 are lost when a power system section 12 becomes inoperable due to a fault.

High risk operations, for example in DP2 or DP3class mode of operation, require a particular high integrity and operational safety of the power system 10, so that under all circumstances, loss of position of the vessel is prevented. This means that no single fault should lead to a complete blackout of the power system 10, as a consequence of which the thruster drives would become inoperable and the vessel would lose its position. For this purpose, in conventional systems, the power systems sections 12 are completely electrically isolated, so that if the power system in one section fails, the others remain operable, thus ensuring that the vessel keeps its position with the remaining thrusters.

In contrast to conventional systems, the power system 10 according to the present embodiment is configured to keep the bus tie breakers 41 closed during high risk operations. Also, the bus coupler circuit breakers 42 are closed. The power system 10 comprises a fault protection system according to an example embodiment, by means of which it is ensured that the high integrity and operational safety of power system 10 required for high risk operations is achieved.

The fault protection system has several components which interact and ensure that upon occurrence of a fault, the power system 10 stays operational and a loss of position of the floating vessel is prevented.

The fault protection system comprises a fault isolation system which is capable of isolating the fault upon occurrence within a short period of time, e.g. shorter than 500 ms, e.g., even shorter than 250 ms. The fault isolation system uses protection relays for fault detection and fault isolation. Furthermore, besides having primary protection functions, it further comprises backup functions and backups to the backup functions in order to make sure that the fault can be isolated fast and efficiently, even if a component should fail. The fault isolation system includes the bus tie circuit breakers 41, the bus coupler circuit breakers 42, as well as the generator circuit breakers 25 and the thruster drive circuit breakers 35. The fault isolation system includes protection relays for each of these circuit breakers. For the generators 21, the bus tie cables 17 and the bus couplers, the protection relays provide a differential over-current protection. As an example, the protection relays provided on both sides of the respective component measure the current flowing through the components and, according to predetermined criteria, determine whether a fault exists in the component. If so, the protection relays can open the circuit breakers on both sides of the respective component, thus electrically isolating the component. For this purpose, the corresponding protection relays can communicate with each other, for example via a communication bus provided between the protection relays. In such configuration, it is possible to determine where the fault is located. As an example, a protection zone may be defined which includes the component to be protected and the circuit breakers coupled thereto. the differential protection may then include the determination of the currents entering and leaving the respective protection zone. If the sum of the currents is not equal to zero, this can indicate a fault in the protected component.

For the loads, for example for the thruster drives 30, for the feeders 51 for the drilling drive, and for the feeders 52 for low voltage loads, short circuit and over-current protection is provided. Such type of protection will be generally sufficient, since if a short circuit occurs in a load, the load will generally draw an excessive current from the power distribution bus 15, which is detected by the respective protection relay, which can trip the associated circuit breaker, thus electrically isolating the load.

For the bus subsections and the bus ties, the fault protection system may comprise one, two or even three backups. One backup protection that may be used in the fault protection system is a short circuit and over-current protection. A further backup protection that may be used is a directional logical overcurrent protection. Again, these can be implemented in the respective protection relays. As an example, if a fault occurs at a particular location, for example a ground fault, the protection relays will observe a flow of current towards the fault location. The protection relay may then determine that in normal operation, no current would flow or the current would flow in the opposite direction, using its directional logic. The protection relay can thus determine that a fault exists, and can trip the corresponding circuit breaker. As a further backup, a breaker failure protection can be implemented in the fault protection system. For example if a bus tie breaker or a bus coupler circuit breaker fails to open, the breaker failure protection, which can be implemented in the respective protection relay, can trip the next circuit breaker to the left side and to the right side of the failed circuit breaker. For a bus tie circuit breaker, the breaker failure protection may trip the circuit breakers on both sides of the bus tie. The protection relays coupled to the different circuit breakers may in such situation operate as master and slave.

Similarly, for the generator circuit breaker 25, backup protection may be provided in form of short circuit and overcurrent protection. As a further backup, a breaker failure protection can be provided. As a breaker failure protection, the fault protection system may for example trip all circuit breakers within the respective power system subsection 11 in case of a failure of the generator circuit breaker.

Similarly, for the circuit breakers towards the different kinds of loads, for example for the thruster drive circuit breaker 35, a breaker failure protection may be provided as a backup. Again, the breaker failure protection may cause all circuit breakers within the respective power system subsection 11 to trip. Thus, in case the main protection fails, the respective power system subsection 11 becomes isolated from the remaining sections and subsections of the power system 10, thus avoiding a propagation of the fault to other parts of the power system 10.

In case of a fault, individual bus subsections 16 of the power distribution bus 15 can thus become electrically isolated from the remaining bus subsections, for example if the fault occurs in a bus tie, or in a subsection of the power distribution bus, or if, as a backup, all circuit breakers in the particular subsection 11 are opened. The fault protection system is now configured to continue operation of the power system 10 with the remaining bus tie circuit breakers 41 and bus coupler circuit breakers 42 closed. Since the power distribution bus 15 is connected in a ring configuration, the remaining subsections 16 of the power distribution bus 15 thus stay connected, even if one bus subsection 16 is disconnected from the bus.

Such configuration of the fault protection system and of the power system 10 has several advantages. Since the power system 10 provides enhanced fault integrity, it can operate with closed bus tie breakers and bus coupler circuit breakers when the dynamically positioned vessel is performing high risk operations. Thus, it is not required to operate at least one generator per power system section 12. The system depicted in FIG. 1 may for example operate with only two generators 21 running. In case one subsection 11 is isolated from the remaining power system 10 due to a fault, only one thruster drive 30 is lost, and if this subsection 11 does not comprise a running generator, full power is maintained on the power distribution bus 15. On the other hand, if the subsection 11 that is to be isolated comprises a running generator, the remaining generator can still supply all other thruster drives with electric power, since the remaining subsections 16 of the power distribution bus 15 stay connected. In operation, the two running generators 21 may for example operate each at 50% load, so that upon loss of one running generator, the remaining generator can take the full load and supply most consumers with electric power.

For achieving the enhanced integrity against faults, the fault protection system according to the present embodiment is furthermore configured to ensure that the operation of power system 10 continues after the occurrence of the fault. Besides isolating the fault, the fault protection system makes sure that the generators and the thruster drives stay operational. A particular problem is that upon occurrence of the fault, there is a significant voltage drop on the power distribution bus 15. The magnitude of the voltage drop will generally depend on the fault location.

For this purpose, the fault protection system comprises a generator ride through system. Each power source 20 comprises an automatic voltage regulator (AVR) 22, which provides generator voltage control. The AVR 22 may for example implement a closed loop control system which compares the generator terminal voltage to a voltage setpoint and adjusts the excitation field current of the generator 21 to keep the output voltage of the generator within an operation band. When operating with connected bus ties 17, a drop in voltage on the power distribution bus 15 can cause the AVR to greatly increase the excitation current, thus damaging components of the exciter. As an example, diodes providing AC to DC conversion for the exciter may take damage, or varistors may take damage. To prevent damage, the fault protection system includes an excitation limiter, which may be comprised in the AVR 22. The excitation limiter limits the excitation field that is provided to the exciter of the generator upon the occurrence of a fault. The excitation limiter may for example detect the occurrence of a fault by monitoring the voltage at the generator terminal or on the power distribution bus 15. On the other hand, the excitation limiter may be configured to detect a field overcurrent condition, i.e. a too high excitation field current being provided to the generator 21, and may as a response ramp down the excitation current to a pre-set value, for example between about 95 and 115% of the rated excitation field current.

The AVR 22 can furthermore be adapted to limit the voltage overshoot after the occurrence of a fault. This function of the AVR 22 may again be part of the fault protection system according to the present embodiment. As mentioned above, when a fault occurs, there will generally be a drop in voltage on the power distribution bus 15. Accordingly, load on the running generators will be increased, as they have to provide the short circuit current caused by the fault. Consequently, the frequency of the AC voltage on power distribution bus 15 will also drop. The AVR 22 can be configured to detect the fault by either the drop of voltage or the drop in frequency at the generator terminal or on the power distribution bus 15. The AVR 22 will now try to maintain the specified operating voltage on power distribution bus 15 by increasing the output voltage of generator 21. This can lead to a quite significant voltage overshoot after the fault is cleared. The AVR 22 can now be configured to limit this overshoot by limiting the voltage setpoint for the generator 21 upon detection of a fault. After the fault is cleared, the voltage setpoint can be ramped back to the operating voltage setpoint within a predetermined time frame. This way, the voltage on the power distribution bus 15 can return to the operating voltage without significant voltage overshoot.

This is particularly important in the power system 10 which operates with closed bus ties 17, as a voltage overshoot can cause several consumers to trip, i.e. to become disconnected from the power system 10 due to overvoltage. In consequence, loss of function would result which can endanger the vessel. By avoiding the voltage overshoot after fault, tripping of these components can be prevented, and thus the propagation of the fault to other sections of power system 10.

The excitation limiter provided in AVR 22 may also be termed over excitation limiter. The fault protection system may furthermore comprise an under excitation limiter within the AVR 22. When a running generator is parallel to one or more other generators determining the voltage on power distribution bus 15, changing, e.g. increasing or decreasing the excitation, can provide power factor control, i.e. the generator will consume or produce reactive power. Equipment failure may require such generator to operate in an under excited condition to absorb reactive power from the power system. Also, if an AVR fails in another generator, this generator could be driven into an over excited condition and thus could start to create excess reactive power. This would need to be absorbed by the other running generators. These may thus be driven into an under excited operation condition. This may lead to excessive core-end heating, power system instability or an operating voltage outside the allowable limit in the affected generators. The under excitation limiter is configured to limit the reactive power inflow into the generator. Effectively, this is done by the under excitation limiter interacting with the AVR to increase the terminal voltage until reactive power inflow is reduced below the setting. Consequently, damage to the further running generators and loss of further generators may thus be prevented.

The fault protection system furthermore comprises a thruster drive ride through system 33. When the power system 10 is operating with closed bus ties 17, the voltage drop on the power distribution bus 15 in case of a fault can result in the thruster drives 30 becoming inoperable and requiring a restart. This can in particular be caused by the capacitors of the variable frequency drive (VFD) 32 which will discharge when the supply voltage provided via the power distribution bus 15 drops or goes to zero. The variable frequency drive 32 may for example comprise a rectifier stage, an intermediate DC bus and an inverter stage which provides AC voltage at variable frequency to the electric AC motors 31. The DC bus is coupled to a capacitor bank which is provided for filtering the DC bus voltage and providing a stable DC source for the inverter section. When the input power into the VFD 32 drops, the only source of power available to run the electric AC motor 31 is the energy stored in the DC bus capacitor bank, which will thus immediately discharge. Once the capacitor banks reach the discharged state, the VFD can not be easily restarted, as a sudden application of power to the VFD 32 would lead to excessive inrush currents, which can affect other parts of the power system 10, i.e. may for example trip generators. Accordingly a full restart of the thruster drive system 30 would be required, in which the capacitor banks are slowly charged. This can take 10 seconds or even more, in which the vessel would loose position and could not be steered. This would be particularly dangerous in high risk situations.

The thruster drive ride through system 33 may be provided in a controller of the VFD, as in the example of FIG. 1. The thruster ride through system 33 now provides electric energy to the DC bus of the VFD 32 upon occurrence of a fault. The voltage on the DC bus is thus maintained above a predetermined voltage threshold, thus preventing the discharging of the capacitors or capacitor banks for a certain amount of time. The voltage threshold may for example be about 80% of the DC bus operating voltage, but it may be set higher or lower values, depending on the particular configuration.

The thruster drive ride through system may for example use kinetic buffering for providing the electric power to the DC bus. In the propeller of the thruster drive, kinetic energy is stored. The rotating propeller is a large spinning mass with relatively little friction. The thruster drive ride through system detects the voltage on the DC bus. If the DC bus voltage drops, the thruster drive ride through system responds by slightly decreasing the output frequency of the inverter of the VFD. This causes a regenerative condition in which the AC electric motor 31, which is still rotating due to the kinetic energy of the propeller, starts producing an AC voltage. In this so called "regenerative condition" the AC voltage produced by electric motor 31 is then rectified by the inverter stage of the VFD 32, i.e. by the anti-parallel or free-reeling diodes which are in parallel with each IGBT transistor in the inverter section. The diodes act as a full wave three-phase bridge and convert the generated AC voltage into a DC voltage, which is then used to maintain the voltage on a DC bus above the defined voltage threshold. The output frequency of the inverter stage can be lowered as needed to regenerate and convert the stored kinetic energy into electric energy for keeping the DC bus above the voltage threshold, i.e. to make the VFD "stay alive". The thruster drive ride through system can be configured to perform kinetic energy recovery until the motor reaches a rotational speed of zero RPM. During the whole time, motor and VFD 32 stay connected and operational, and the DC bus voltage is maintained. A very quick and smooth restart of the thruster drive 30 can thus be achieved when the power on the power distribution bus 15 is restored. Generally, isolation of the fault and recovery of the power on power distribution bus 15 may be faster than one second, generally faster than 500 ms or even than 250 ms. The kinetic buffering provided by the thruster drive ride through system can be on the order of 1-3 seconds. Accordingly, the thruster drive 30 can be kept alive over the whole time of the blackout.

Thus, by means of the fault isolation system, the generator ride through system and the thruster drive ride through system forming part of the fault protection system, it is possible to operate the power system with closed bus ties and closed bus coupler circuit breakers, and to keep these circuit breakers of the unaffected subsections of the power system closed upon occurrence of a fault. The fault isolation system quickly isolates the fault, while the generator ride through system and the thruster drive ride through system make sure that the generator continuous operation and continues to supply electric power to the power distribution bus 15 and to the thruster drives 30 after isolation of the fault. Power is thus immediately restored after isolation of the fault, and the thruster drives can immediately continue to operate after fault isolation, and can keep the vessel in position.

In the example of FIG. 1, even if a power system subsection 11 which comprises one of two running generator becomes isolated from the remaining power system 10 due to a fault, the further single generator which is running can supply all five remaining thruster drives via the remaining sections of power distribution bus 15, since a) the circuit breakers 41, 42 of the unaffected subsections remain closed, b) the power distribution bus 15 is provided in a ring configuration and c) the generator 21 and the thruster drives 30 stay operational.

It should be clear that the power system and the fault protection system described above with respect to FIG. 1 are only example embodiments, and that other embodiments may configured differently.

As an example, the power system 10 may comprise further or fewer power system sections 12, or further or fewer power system subsections 11, with the corresponding number of bus subsections 16. The thruster drive ride through system may for example be implemented differently, e.g. by providing a power storage device connected to the DC bus of the respective VFD for maintaining the predefined voltage level on the DC bus. Such power storage device may for example include a battery or a capacitor bank or the like. Also, it should be clear that the partitioning and arrangement of the components is only schematic for the purpose of illustrating their function, and that they may be implemented physically in form of different units or at different positions. As an example, the VFD controller 33 may be substituted by a common VFD controller located spaced apart from the VFDs 32. The bus subsections 16 may be provided in form of bus bars. The protection relays and associated circuit breakers 41, 42, 25, 35, . . . may for example be provided in switchboards, with the switch boards belonging to different sections 12 of the power system 10 being located in different rooms separated by fire proof walls. Also, additional components may be present, for example a thruster drive transformer coupled between the VFD 32 and the circuit breaker 35.

Figure 2:
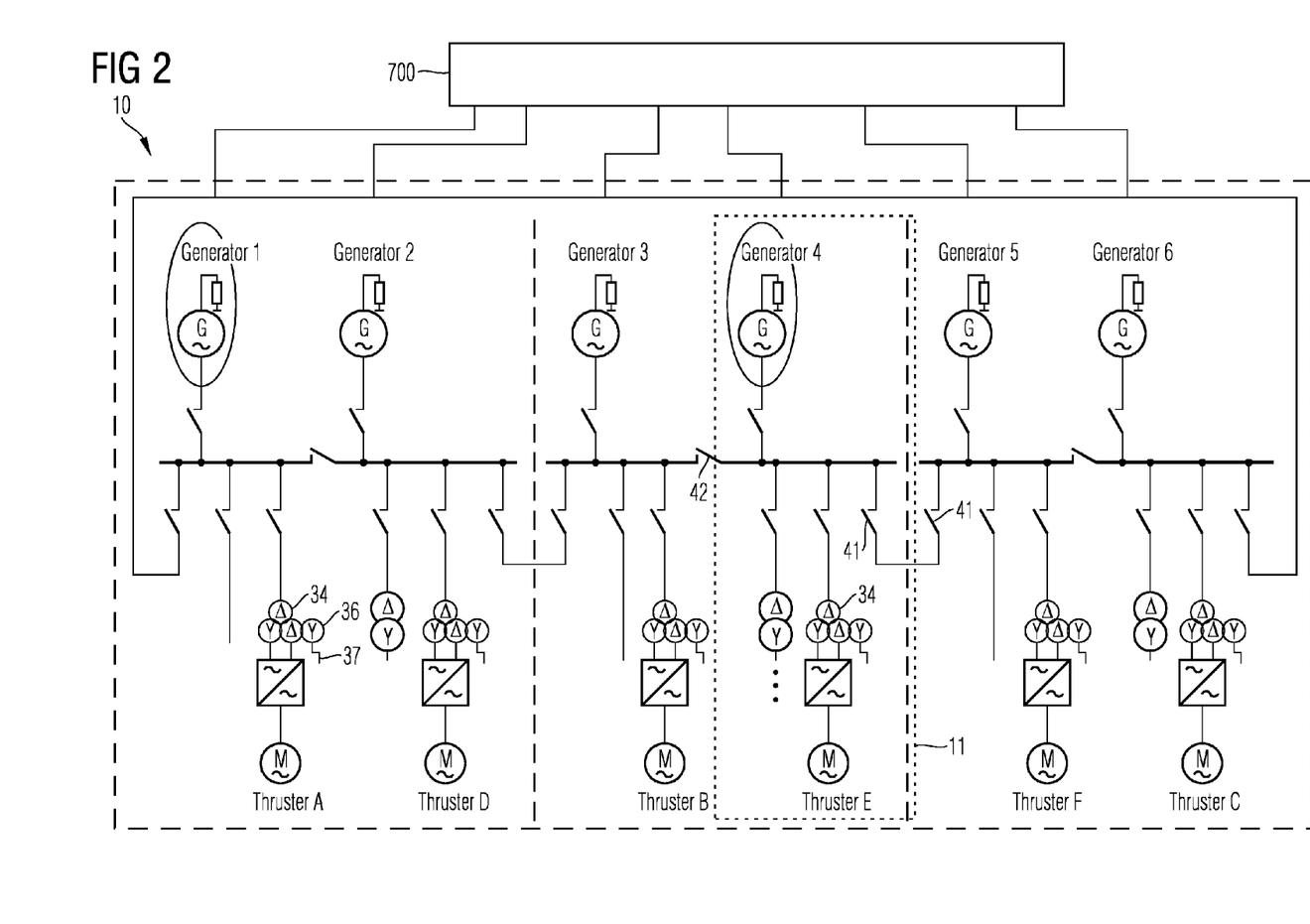
FIG. 2 is a schematic diagram showing the power system of a dynamically positioned vessel of FIG. 1 in more detail.

This is for example illustrated in more detail in FIG. 2. FIG. 2 shows the same embodiment of the power system 10 as FIG. 1, with the focus on particular components of the power system 10. For the purpose of clarity, the remaining components that were already explained with respect to FIG. 1 were not again designated by reference numerals in FIG. 2.

In FIG. 2, the doted line highlights a power system subsection 11 which may become isolated upon occurrence of a fault in this power system subsection. The circuit breakers designated by the reference numerals 41 and 42 are opened to isolate the power system subsection 11. Two generators that are operating are encircled by a line. Accordingly, upon isolation of subsection 11, the generator 1 continues to supply electric power to the remaining subsections of power system 10.

That a generator is operating means that a prime mover is actually moving the generator. A prime mover will generally be an engine, such as a diesel engine or a gas turbine. Power output of the prime mover can be adjusted be means of a governor (not shown), which adjusts the power output in accordance with the active power demand. When the load on the running generator 1 increases due to the fault and the isolation of subsection 11, the prime mover of generator 1 is required to provide a higher power output, which results in significant torque changes. This can be reduced by means of the AVR of the generator implementing the excitation limiter and the voltage overshoot prevention.

Reference numeral 70 designates a power management system (PMS) which communicates with the different subsections 11 of the power system 10. The circuit breakers and protection relays may for example be provided in switchboards which the PMS 70 interfaces, e.g. by redundant serial communication. PMS 70 may furthermore interface the power supply systems 70 including the generators 21. The power management system 70 may for example issue commands comprising the starting of a generator or the stopping of a generator, the opening or the closing of a circuit breaker and the like. The PMS 70 may perform various power management functions, including the starting of a new generator when required, for example due to an increase in load or due to the loss of a generator after the occurrence of a fault. For this purpose, power sensors from each generator may be interfacing the PMS 70, and the PMS may furthermore obtain information about the currently connected load. On the other hand, it may determine the load from the current power output of each generator. PMS 70 may now for example perform a load dependent start/stop of engines and generators, a fault dependent start/stop of engines and generators, a selection of the operational mode of the power system, e.g. DP2 or DP3 with closed bus tie circuit breakers, and the like. It may selectively isolate a section or subsection of the power system, or perform a reconnection of the main ring, i.e. the power distribution bus 15. PMS 70 may for this purpose also comprise a HMI (human machine interface), via which an operator may monitor the power system and may be alarmed of certain situations, such as a fault.

FIG. 2 furthermore illustrates a thruster drive transformer 34 which steps down the AC voltage provided on the power distribution bus 15. The AC voltage on power distribution bus 15 may be within a medium voltage range, for example between about 5000 and about 30000 Volt, for example at 11000 Volt. Transformer 34 may for example step this voltage down to about 3 to 8 kV, e.g. 5000 or 6000 Volt. The output voltage of transformer 34 depends on the type of electric AC motor 31 used in the respective thruster drive.

Although in the figures, only single electric connections are shown, it should be clear that the power system 10 is a three-phase power system, i.e. three-phase AC power may be provided at the generator outputs, and the power distribution bus 15 comprises bus bars for each phase of the three phase AC electric power. The thruster drive transformer 34 comprises one primary winding which accordingly has three windings, one for each phase, which are in the example of FIG. 2 connected in a delta configuration. Transformer 34 furthermore comprises two secondary windings, each again for the three phases, wherein in one winding, the three phases are connected in a delta configuration and in the other winding in a star or Y-configuration. Consequently, there will be a phase shift in the three phase AC electric power that is output by the two different secondary windings. Both generator outputs are provided to the variable frequency drive 32, which can thus produce a DC voltage on the intermediate DC bus having reduced harmonic distortions.

In the present embodiment, the transformer 34 has a fourth winding 36, i.e. a third secondary winding. The power system 10 further comprises an electric connection 37 from the fourth winding 36 to a thruster utilities and/or engine support switch board. The thruster utilities switchboard provides electric power to utilities of the thruster drive 30 which are necessary to operate the thruster drive. The engine support switch board provides electric power to utilities of the engine which drives the respective generator, i.e. to the prime mover of the generator. By having these switchboards powered from a fourth winding 36 of the transformer 34, it is not necessary to provide an additional transformer, thus saving costs, weight and space. Furthermore, all the utilities of the thruster drive and of the engine of the generator of a particular power system subsection 11 are directly powered from the respective power distribution bus subsection. Accordingly, if a power system subsection 11 becomes isolated, e.g. when opening the respective bus tie breakers and bus coupler circuit breakers, the subsection 11 remains fully functional as an isolated island which can continue to operate both, the generator and the thruster drive. If a fault should for example cause a whole section 12 of the power system 10 to become isolated from the remaining sections, one subsection 11 in which the fault occurs can be inoperable and be isolated from the remaining subsection 11, which as an isolated island can still continue to operate. Accordingly, operational safety is enhanced, and the loss of thruster drives upon occurrence of a fault can be kept small.

Figure 3:
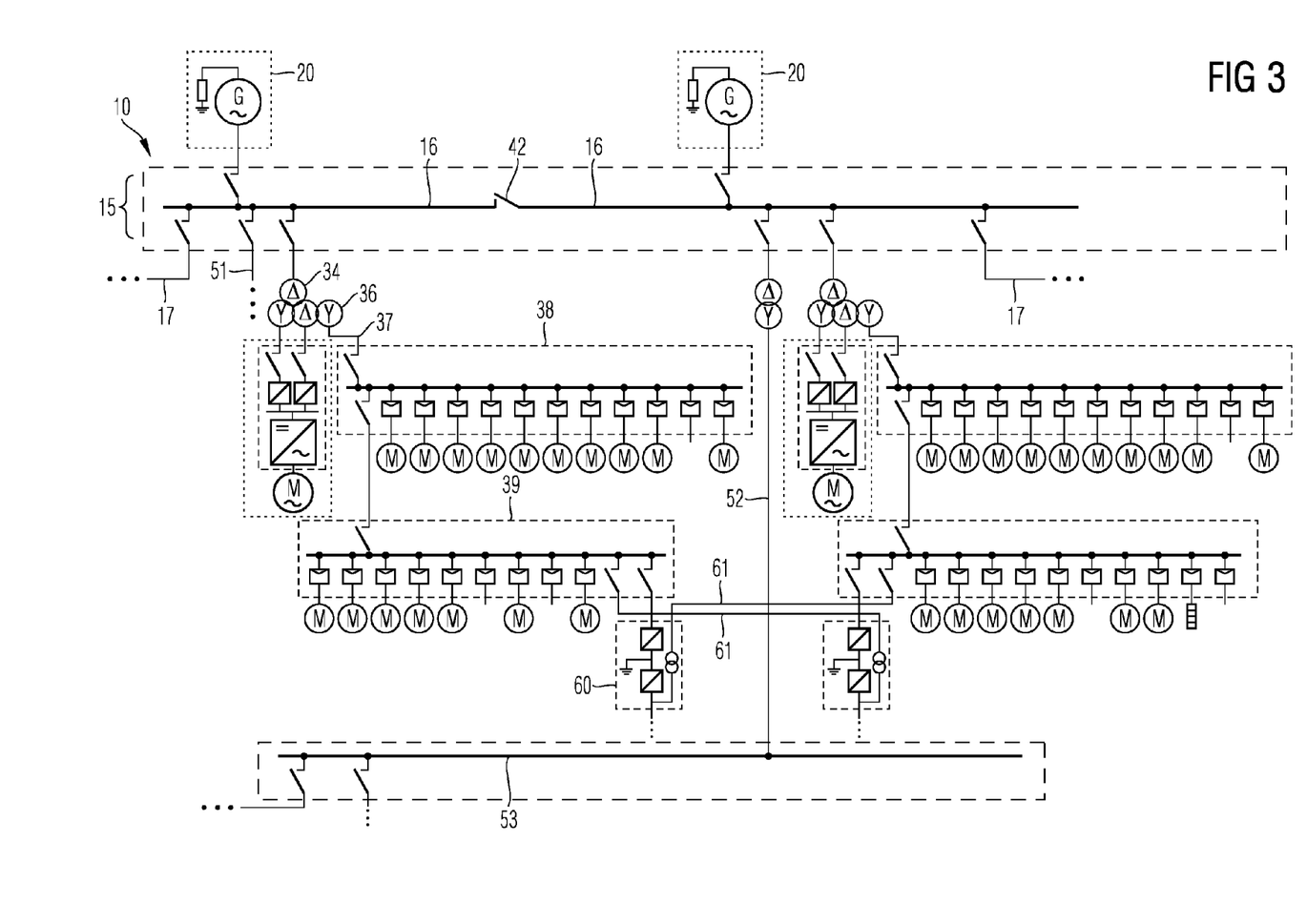
FIG. 3 is a schematic diagram showing the switchboards for supplying electric power to thruster and generator utilities of the power system of FIG. 1 in more detail.

This is in more detail depicted in FIG. 3 for a single section 12 of the power system 10. FIG. 3 shows the thruster utilities switchboard 38 and the engine support switchboard 39, both being coupled to the fourth winding 36 of transformer 34. Thruster utilities switchboard 38 may for example power components such as a seawater cooling pump, a fresh water cooling pump, a thruster hydraulic pump, thruster lube oil pump or the like. The engine support switchboard 39 may for example power a generator lube oil pump, a diesel generator lube oil pump, a diesel generator pre-heater feeder, engine room supply and extract fans or the like.

The power system 10 may furthermore comprise an uninterruptable power supply 60 which is provided for each subsection 11 of the power system. In the example of FIG. 3, the uninterruptable power supply (UPS) 60 is coupled to both, the thruster utilities switchboard and the engine support switchboard 38, 39. The UPS 60 may for example comprise a battery which can supply electric power to both switchboards in case of a failure of the main power supply. Accordingly, both the generator and the thruster of the respective power system subsection 11 can stay operational, even if the main power supply is temporarily interrupted due to a fault. Again, this ensures a fast recovery after the occurrence and isolation of a fault.

The fault protection system furthermore comprises an electric interlinked connection 61 between the UPS 60 of one power system subsection 11 and the switchboards 38, 39 of a different power system subsection 11. Thus, each of the switchboards 38, 39 is effectively coupled to two UPSs. Redundant UPSs are thus provided, thereby enhancing the operational reliability of the engine and thruster utilities. Also, the coupling to two different UPSs may be used to prolong the time over which the respective utilities can be operated without primary power.

It has to be noted that the electric interlinked connection 61 is of such nature that the switchboards 38, 39 of different power system subsections 11 remain isolated from each other, so that a fault cannot propagate through these sections. This can be achieved by means of the coupling as illustrated in UPS 60. In FIG. 3, the battery or the capacitor bank of UPS 60 is not explicitly shown, but the connection thereto is indicated.

Please note that FIG. 3 illustrates a particular configuration of the power system 10 which is shown in the FIGS. 1 and 2, so that the explanations given further above with respect to FIGS. 1 and 2 are equally applicable to power system 10 of FIG. 3.

Figure 4:
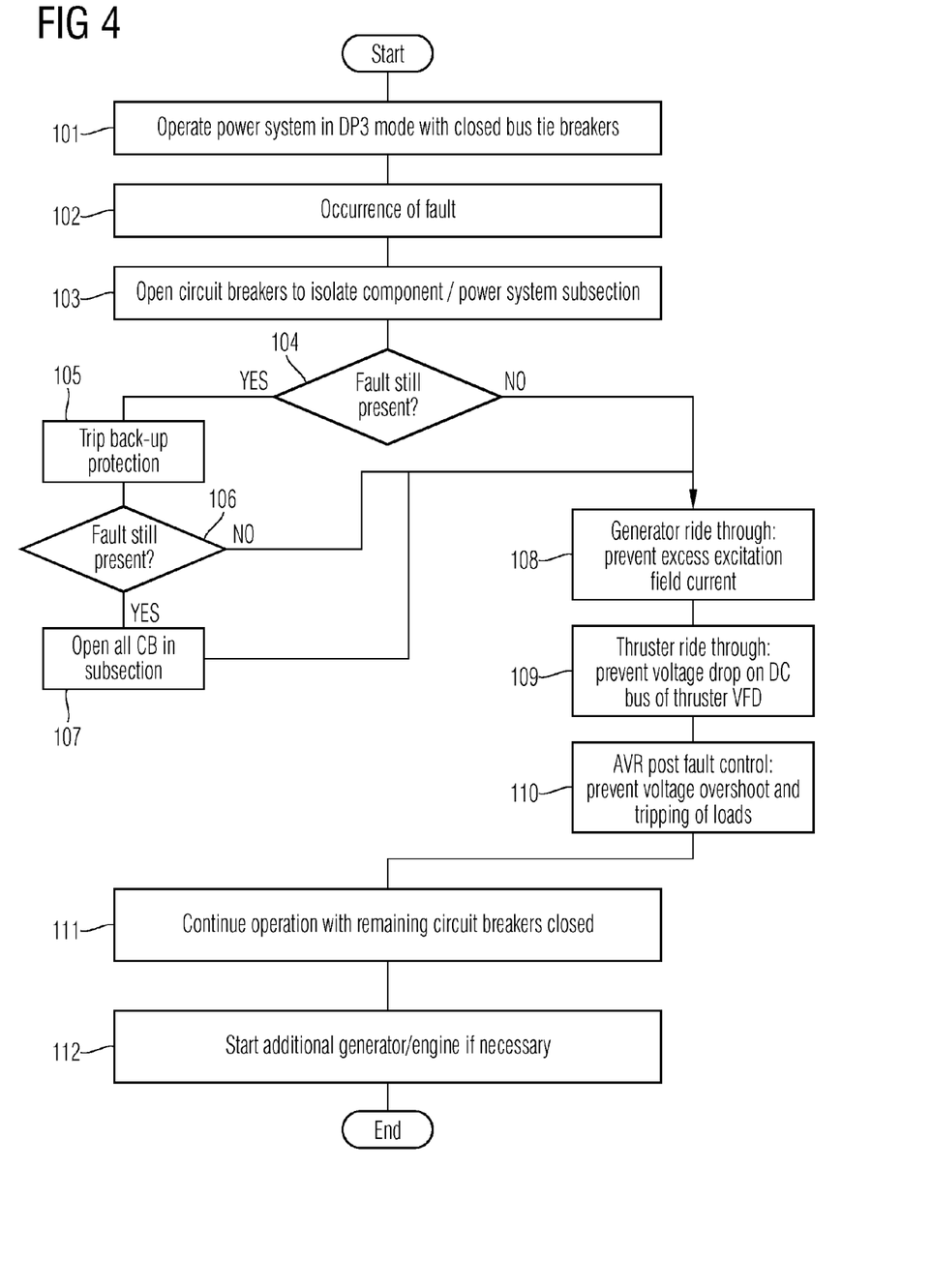
FIG. 4 is a schematic flow diagram illustrating a method according to an example embodiment.

FIG. 4 shows a flow diagram of a method in accordance with an example embodiment which may be performed on any of the above described embodiments of the power system 10 including the fault protection system. In step 101, the power system of the dynamically positioned vessel is operated during a high risk operation in a DP2 or DP3 class mode of operation, with the bus tie breakers being closed. In step 102, a fault occurs in the power system. In step 103, the fault is identified, e.g. by means of the protection relays. Circuit breakers are opened to isolate the respective component, or are opened to isolate the respective power system subsection 11 in which the fault occurred. Fault isolation may occur e.g. within 150 ms, for example within about 140 ms for a fault in a thruster drive (over-current protection) and about 100 ms for a fault on a bus bar of the power distribution bus 15 (differential protection).

In decision step 104, it is checked whether the fault is still present after trying to isolate it in step 103. If the fault is still present, a backup protection is tripped in step 105. As mentioned above, this may for example be a short circuit or over-current protection. If after tripping the backup protection, the fault is still present (decision step 106), all circuit breakers in the respective power system subsection 11 are opened as a further backup (step 107), e.g. by the above mentioned breaker failure protection. Generally, step 107 should be completed within less than 500, e.g., within less than 250 ms after occurrence of the fault. Note that this is only an exemplary method of clearing the fault, and modified or more complex methods may be used.

Parallel to the isolation of the fault by the above measures, steps 108 to 110 are performed, which ensure that the power system 10 stays operational. In step 108, generator ride through protection is performed by preventing excess excitation field currents to be caused by the AVR of the generator that is currently operational. In step 109, thruster drive ride through protection is performed by preventing a voltage drop on the DC bus of the thruster VFD in any of the manners described further above. Consequently, both the running generators as well as the thruster drives stay operational. Furthermore, step 110 provides voltage overshoot limitation after the fault is cleared by reducing the voltage setpoint for the generator in the above described manner. High inrush currents, high torque variations on the prime mover and the tripping of further loads can thus be prevented.

The circuit breakers in the remaining power system subsections 11 remain closed during the fault and after clearance of the fault (step 111). Operation is continued. If necessary, additional generators and associated engines are started to provide enough electric power on the power distribution bus 15 (step 112). This may for example be necessary if a running generator is located within the power system subsection 11 that became isolated when clearing the fault.

As can be seen from the above description, the disclosed power system and fault protection system may provide an operational safety and protection against faults that makes the system capable of operating with closed bus ties even during high risk operations. The occurrence of a single fault in the power system will not lead to a blackout of the power system, and both, generators and thrusters, remain operational, so that position keeping of the dynamically positioned vessel is maintained. Certain embodiments may thus provide enhanced power system integrity to faults and a reduced risk of blackout of a whole section, since sections are subdivided into subsections. The risk of a total blackout can also be reduced due to the protection scheme and the use of control functionalities by the fault protection system. The enhanced vessel integrity to faults which affect the position keeping enable the operation with closed bus tie breakers in all operational modes, such as DP2 and DP3. This results in reduced fuel costs and a reduced emission of combustion gasses, such as $CO_2$. Furthermore, fewer generators need to be run, resulting in reduced operating hours and maintenance costs for engines and generators. Also, servicing is facilitated, since it is possible to completely shut down the engines and generators of a particular section, and thus perform service without having engines operating in the same engine room. Voltage overshoot prevention and the UPS furthermore result in a reduced risk to loose essential consumers after the occurrence of a fault.

While specific embodiments are disclosed herein, various changes and modifications can be made without departing from the scope of the invention. The present embodiments are to be considered in all respects as illustrative and non restrictive, and all changes coming within the meaning and equivalency range of the appended claims are intended to be embraced therein.

What is claimed is:

1. A fault protection system of a power system of a dynamically positioned vessel, wherein the power system is separated into two or more power system sections each comprising a bus section of a power distribution bus, wherein the bus sections are connected by bus ties in a ring configuration, and wherein each power system section comprises two or more power system subsections each comprising a bus subsection of the power distribution bus, the bus subsections of the same power system section being connected by one or more bus couplers, wherein each bus subsection comprises a connection to a generator and a connection to a thruster drive of the dynamically positioned vessel, wherein the fault protection system comprises:

a fault isolation system including for each power system section (a) a bus tie circuit breaker for breaking the connection provided by a respective bus tie to another power system section, and (b) one or more bus coupler circuit breakers for breaking one or more connections provided by one or more bus couplers between the two or more power subsections of the respective power system section, the fault isolation system being configured to implement a differential over-current protection scheme for operating at least the bus tie circuit breaker and the one or more bus coupler circuit breakers, a generator ride through system comprising for each power system subsection an excitation limiter for the generator coupled to the respective bus subsection, the generator ride through system being adapted to limit the excitation field current provided to the generator upon occurrence of a fault, and a thruster drive ride through system comprising at least one thruster drive power source distinct from the generators of the power system and configured to provide electric energy to a DC bus of a variable frequency drive (VFD) of the thruster drive of each power system subsection during a temporary post-fault period after occurrence of a fault so as to maintain the voltage on the DC bus above a predetermined voltage threshold, such that a respective thruster drive power source is configured to supply electrical energy to a respective DC bus of the VFD of a respective thruster drive during the temporary post-fault period to maintain the voltage on the DC bus above a defined minimum threshold, wherein the fault protection system is configured, upon the occurrence of a fault in the power system, to isolate the fault by tripping the component of the power subsection in which the fault occurred and/or by opening one or more circuit breakers in the power system subsection in which the fault is located, and to continue operation of the power system with the remaining bus tie circuit breakers and bus coupler circuit breakers closed.

2. The fault protection system of claim 1, wherein the fault isolation system is configured to implement a differential over-current protection and/or a directional over-current protection against faults for at least the bus ties and the bus subsections.

3. The fault protection system of claim 2, wherein the fault isolation system comprises protection relays for operating at least the bus tie circuit breakers and the bus coupler circuit breakers, the protection relays implementing the differential over-current protection and/or the directional over-current protection for the bus ties and the bus subsections.

4. The fault protection system of claim 2, wherein the fault isolation system is further configured to implement a short circuit and over-current protection by means of at least the bus tie circuit breakers and the bus coupler circuit breakers.

5. The fault protection system of claim 1, wherein the fault isolation system further comprises for each power subsection, a generator circuit breaker for breaking the connection to the generator and a thruster drive circuit breaker for breaking the connection to the thruster drive.

6. The fault protection system of claim 1, further comprising an automatic voltage regulator containing the excitation limiter, the automatic voltage regulator being adapted to automatically adjust the voltage provided by the respective generator to keep the voltage within an operation band.

7. The fault protection system of claim 6, wherein the automatic voltage regulator is adapted to detect the occurrence of a fault by detecting a drop in the voltage at the generator output or at the power distribution bus, the automatic voltage regulator being adapted to decrease a voltage setpoint for the generator after the detection of a fault and to control the output voltage of the generator in accordance with the reduced voltage setpoint, so as to limit voltage overshoot after the occurrence of a fault.

8. The fault protection system of claim 1, wherein the thruster drive ride through system comprises a variable frequency drive controller for the variable frequency drive of each thruster drive, the variable frequency drive controller being adapted to decrease the output frequency of the respective variable frequency drive upon a drop in voltage on the DC bus of the variable frequency drive, thereby causing the variable frequency drive to operate in a generating condition in which electric energy is generated by an electric motor of the thruster drive and is fed back to the DC bus to maintain the voltage on the DC bus above the voltage threshold.

9. The fault protection system of claim 1, wherein the thruster drive ride through system comprises a power storage device, such as a battery, which is coupled to the DC bus of the variable frequency drive, the power storage device being adapted to supply electric power to the DC bus in case of a drop of voltage on the DC bus in order to maintain the voltage on the DC bus above the voltage threshold.

10. The fault protection system of claim 1, wherein the power system further comprises for each power system subsection a connection to a thruster utilities switchboard electrically coupled to the generator of the respective power system subsection for providing electric power to utilities of the thruster drive, and a connection to an engine support switchboard electrically coupled to the generator of the respective power system subsection for providing electric power to utilities of the engine operating the generator of the power system subsection, and wherein the fault protection system further comprises for each power system subsection a circuit breaker for breaking the connection to the thruster utilities switchboard and the engine support switchboard.

11. The fault protection system of claim 10, further comprising an uninterruptable power supply for each power system subsection, the uninterruptable power supply being coupled to the thruster utilities switchboard and/or the engine support switchboard.

12. The fault protection system of claim 11, further comprising an electric interlink connection from the thruster utilities switchboard or the engine support switchboard of one power system subsection to the uninterruptible power supply of another power system sub section.

13. A power system of a dynamically positioned vessel, comprising:
two or more power system sections, each comprising a bus section of a power distribution bus, wherein the bus sections are connected by bus ties in a ring configuration, and wherein each power system section comprises two or more power system subsections each comprising a bus subsection of the power distribution bus, the bus subsections of the same power system section being connected by one or more bus couplers, wherein each bus subsection comprises a connection to a generator and a connection to a thruster drive of the dynamically positioned vessel, and a fault detection system comprising:
a fault isolation system including for each power system section (a) a bus tie circuit breaker for breaking the connection provided by a respective bus tie to another power system section, and (b) one or more bus coupler circuit breakers for breaking one or more connections provided by one or more bus couplers between the two or more power subsections of the respective power system section, the fault isolation system being configured to implement a differential over-current protection scheme for operating at least the bus tie circuit breaker and the one or more bus coupler circuit breakers, a generator ride through system comprising for each power system subsection an excitation limiter for the generator coupled to the respective bus subsection, the generator ride through system being adapted to limit the excitation field current provided to the generator upon occurrence of a fault, and a thruster drive ride through system configured to provide electric energy to a DC bus of a variable frequency drive of the thruster drive of each power system section upon occurrence of a fault so as to maintain the voltage on the DC bus above a predetermined voltage threshold, a thruster drive ride through system comprising at least one thruster drive power source, distinct from the generators of the power system, configured to provide electric energy to a DC bus of a variable frequency drive (VFD) of the thruster drive of each power system subsection during a temporary post-fault period after occurrence of a fault so as to maintain the voltage on the DC bus above a predetermined voltage threshold, wherein the thruster drive ride through system is configured to detect a voltage drop on the power distribution bus during the temporary post-fault period, and in response, activate a respective thruster drive power source for delivering electrical energy to the DC bus of the VFD of at least one respective thruster drive, wherein the fault protection system is configured, upon the occurrence of a fault in the power system, to isolate the fault by tripping the component of the power subsection in which the fault occurred and/or by opening one or more circuit breakers in the power system subsection in which the fault is located, and to continue operation of the power system with the remaining bus tie circuit breakers and bus coupler circuit breakers closed.

14. The power system according to claim 13, further comprising for each power system subsection a connection to a thruster utilities switchboard for providing electric power to utilities of the thruster drive, and a connection to an engine support switchboard for providing electric power to utilities of the engine operating the generator of the power system subsection, and the power system further comprising a transformer for each power system subsection connected to the respective bus subsection, the transformer providing electric power to a respective thruster drive coupled to the bus subsection, wherein the transformer comprises an additional secondary winding electrically coupled to the thruster utilities switchboard and the engine support switchboard of the power system subsection for providing electric power to both switchboards.

15. A method of operating a fault protection system of a power system of a dynamically positioned vessel, wherein the power system is separated into two or more power system sections each comprising a bus section of a power distribution bus, wherein each power system section comprises two or more power system subsections each comprising a bus subsection of the power distribution bus, the bus subsections of the same power system section being connected by one or more bus couplers, wherein each bus subsection comprises a connection to a generator and a connection to a thruster drive of the dynamically positioned vessel, the method comprising:

detecting a fault in the power system, localizing the fault in the power system, electrically isolating a component in which the fault occurred from the remaining power system by opening a circuit breaker coupled to the component or isolating a power system subsection in which the fault occurred from the remaining power system by opening bus tie and/or bus coupler circuit breakers of the respective bus subsection, and after electrically isolating the component in which the fault occurred, determining whether the fault is still present, if it is determined that the fault is still present after electrically isolating the component in which the fault occurred, opening all circuit breakers in the power system subsection in which the fault occurred, continuing operation of the power system with the remaining bus tie circuit breakers and bus coupler circuit breakers closed.

* * * * *